US 12,179,597 B2
(12) United States Patent
Kim et al.

(10) Patent No.: US 12,179,597 B2
(45) Date of Patent: Dec. 31, 2024

(54) HYBRID DRIVE MODULE

(71) Applicant: Valeo Kapec Co., Ltd., Daegu (KR)

(72) Inventors: Jungwoo Kim, Daegu (KR); Jinsu Park, Daegu (KR)

(73) Assignee: Valeo Kapec Co., Ltd., Daegu (KR)

(*) Notice: Subject to any disclaimer, the term of this patent is extended or adjusted under 35 U.S.C. 154(b) by 328 days.

(21) Appl. No.: 17/783,514

(22) PCT Filed: Oct. 28, 2020

(86) PCT No.: PCT/KR2020/014841
§ 371 (c)(1),
(2) Date: Jun. 8, 2022

(87) PCT Pub. No.: WO2021/118054
PCT Pub. Date: Jun. 17, 2021

(65) Prior Publication Data
US 2023/0012163 A1 Jan. 12, 2023

(30) Foreign Application Priority Data
Dec. 9, 2019 (KR) .................. 10-2019-0163107

(51) Int. Cl.
*B60K 6/40* (2007.10)
*B60K 6/387* (2007.10)
(Continued)

(52) U.S. Cl.
CPC ........... *B60K 6/40* (2013.01); *B60K 6/387* (2013.01); *B60K 6/48* (2013.01); *B60K 11/02* (2013.01);
(Continued)

(58) Field of Classification Search
CPC . B60K 6/40; B60K 6/387; B60K 6/48; B60K 11/02; B60K 2006/4825;
(Continued)

(56) References Cited

U.S. PATENT DOCUMENTS 7,509,802 B2 * 3/2009 Hammond ............... B60K 6/26
60/330
8,545,367 B2 * 10/2013 Hartz .................... B60W 10/30
475/5
(Continued)

FOREIGN PATENT DOCUMENTS

JP 2011-126460 A 6/2011
KR 10-2013-0132771 A 12/2013
(Continued)

OTHER PUBLICATIONS

International Search Report issued Mar. 16, 2021 in PCT/KR2020/014841 filed on Oct. 28, 2020, 2 pages.
(Continued)

*Primary Examiner* — Bryan A Evans
(74) *Attorney, Agent, or Firm* — Oblon, McClelland, Maier & Neustadt, L.L.P.

(57) ABSTRACT

A hybrid drive module is disclosed. An exemplary embodiment of the present invention provides a hybrid drive module that selectively transmits torque transmitted from an engine and a motor to a transmission including a housing disposed between the engine and the transmission, a drive shaft rotatably mounted inside the housing in a radial direction with its one end portion toward the engine based on an axial direction protruding from the housing and to which torque of the engine is inputted, a rotor hub provided within the housing and mounted with a rotor of the motor on its radially outer side, and in which a hub plate part integrally extending toward the drive shaft and rotatably connected to the other end portion of the drive shaft toward the transmission based on the axial direction is formed on its radially inner side, a rotor hub ridge, an inner circumferential surface of which is rotatably supported by the housing based on the radial direction and an external circumferential surface of which is fixed to the rotor hub based on the axial direction (Continued)

at the side of the engine, an engine clutch disposed at the engine side in the axial direction with the hub plate part interposed therebetween, and configured to directly connect the drive shaft and the rotor hub to selectively transmit the torque of the engine to the rotor hub, and a torque converter disposed at the side of the transmission in the axial direction with the hub plate part interposed therebetween to be connected to the rotor hub, and configured to multiply the torque of the engine, torque of the motor, or the torque of the engine and the motor when a vehicle is initially driven, or to transmit it to the transmission in a ratio of 1:1, wherein at least one fluid groove for supplying an operating fluid to the rotor to cool the rotor between the rotor hub and the engine clutch is formed on a surface of the hub plate part toward the engine clutch based on the axial direction.

25 Claims, 11 Drawing Sheets

(51) Int. Cl.
| | | |
|---|---|---|
| | *B60K 6/48* | (2007.10) |
| | *B60K 11/02* | (2006.01) |
| | *F16H 45/02* | (2006.01) |
| | *F16H 45/00* | (2006.01) |

(52) U.S. Cl.
CPC ...... *F16H 45/02* (2013.01); *B60K 2006/4825* (2013.01); *B60Y 2200/92* (2013.01); *F16H 2045/002* (2013.01); *F16H 2045/0284* (2013.01)

(58) Field of Classification Search
CPC ............... F16H 45/02; F16H 2045/002; F16H 2045/0284; B60Y 2200/92
See application file for complete search history.

(56) References Cited

U.S. PATENT DOCUMENTS

| | | | |
|---|---|---|---|
| 8,652,001 B2* | 2/2014 | Iwase | ................... F16D 21/08 477/8 |
| 9,358,866 B2 | 6/2016 | Hartz et al. | |
| 10,023,184 B2 | 7/2018 | Hartz et al. | |
| 10,167,907 B2* | 1/2019 | Satoyoshi | ................ B60K 6/48 |
| 10,807,457 B2* | 10/2020 | Ogino | .................... B60L 50/16 |
| 10,814,713 B2* | 10/2020 | Ogino | .................... B60K 6/387 |
| 2011/0132710 A1 | 6/2011 | Schenck | |
| 2012/0242199 A1 | 9/2012 | Iwase et al. | |
| 2012/0258838 A1 | 10/2012 | Hartz et al. | |
| 2013/0087225 A1 | 4/2013 | Frait et al. | |
| 2014/0080664 A1 | 3/2014 | Hartz et al. | |
| 2016/0244053 A1 | 8/2016 | Hartz et al. | |

FOREIGN PATENT DOCUMENTS

| | | |
|---|---|---|
| KR | 10-2019-0033070 A | 3/2019 |
| WO | WO 2019/024956 A1 | 2/2019 |

OTHER PUBLICATIONS

Extended European Search Report issued in European Patent Application No. 20898351.0 on Nov. 5, 2024.

\* cited by examiner

HYBRID DRIVE MODULE

TECHNICAL FIELD

The present invention relates to a hybrid drive module. More particularly, the present invention relates to a hybrid drive module that transmits torque inputted from an internal combustion engine and a motor to a transmission.

BACKGROUND ART

Environment-friendly technology in vehicles is a core technology of a future automobile industry, and automakers are focusing on developing environment-friendly vehicles to achieve environmental and fuel efficiency regulations.

An electric vehicle (EV) and a hybrid electric vehicle (HEV) that utilize electrical energy, and a double clutch transmission (DCT) with improved efficiency and convenience may be examples of future vehicle technologies.

The hybrid electric vehicle is a vehicle using two or more power sources that may be combined in various schemes, and typically, a gasoline or diesel engine using fossil fuels and a motor/generator driven by electric energy are hybrid-combined to act as the power sources.

Since the hybrid electric vehicle is equipped with an internal combustion engine and a motor at the same time, it is possible to dramatically reduce harmful gas emission and fuel efficiency compared to general vehicles.

In order for such a hybrid electric vehicle effectively to transmit torque of the engine and the motor to the transmission to increase efficiency and to maximize fuel efficiency, and development of a drive module equipped with an engine clutch and a torque converter that enable effective power transmission and size and parts reduction has been required.

Accordingly, research and development of a hybrid drive module that is modularized together with the motor of a hybrid electric vehicle, including the functions of the engine clutch and the torque converter to efficiently combine and transmit driving force of the engine and the motor in the hybrid electric vehicle (HEV), has been continuously made.

DISCLOSURE

Technical Problem

The present invention has been made in an effort to provide a hybrid drive module having advantages of simplifying a layout of a cooling flow passage design and improving durability of a rotor by smoothly supplying an operating fluid to the rotor equipped in the rotor hub and cooling it.

In addition, the present invention has been made in an effort to provide a hybrid drive module having advantages of reducing an overall outer diameter and a full length in and axial direction, by optimizing arrangement of an engine clutch and a torque converter through a rotor hub and by forming, in the rotor hub, a cooling flow passage that is connected to a compensation chamber of an engine clutch to cool a rotor.

Technical Solution

An exemplary embodiment of the present invention provides a hybrid drive module that selectively transmits torque transmitted from an engine and a motor to a transmission, including a housing disposed between the engine and the transmission, a drive shaft rotatably mounted inside the housing in a radial direction with its one end portion toward the engine based on an axial direction protruding from the housing and to which torque of the engine is inputted, a rotor hub provided within the housing and mounted with a rotor of the motor on its radially outer side, and in which a hub plate part integrally extending toward the drive shaft and rotatably connected to the other end portion of the drive shaft toward the transmission based on the axial direction is formed on its radially inner side, a rotor hub ridge, an inner circumferential surface of which is rotatably supported by the housing based on the radial direction and an external circumferential surface of which is fixed to the rotor hub based on the axial direction at the side of the engine, an engine clutch disposed at the engine side in the axial direction with the hub plate part interposed therebetween, and configured to directly connect the drive shaft and the rotor hub to selectively transmit the torque of the engine to the rotor hub, and a torque converter disposed at the side of the transmission in the axial direction with the hub plate part interposed therebetween to be connected to the rotor hub, and configured to multiply the torque of the engine, torque of the motor, or the torque of the engine and the motor when a vehicle is initially driven, or to transmit it to the transmission in a ratio of 1:1, wherein at least one fluid groove for supplying an operating fluid to the rotor to cool the rotor between the rotor hub and the engine clutch is formed on a surface of the hub plate part toward the engine clutch based on the axial direction.

The engine clutch may include a clutch piston, an outer circumferential surface and an inner circumferential surface of the clutch piston, based on the radial direction, being mounted on the rotor hub ridge slidably in the axial direction, a drive plate, an inner circumferential end of which is fixed to an outer circumferential surface of the other end of the drive shaft based on the radial direction, at least one first friction plate coupled to the drive plate and configured to move by the clutch piston in the axial direction, a carrier fixed to the hub plate part at the engine side based on the axial direction, and at least one second friction plate coupled to the carrier and disposed between the first friction plate and the carrier to move in the axial direction.

Between the rotor hub ridge and the clutch piston, a clutch operating chamber configured to operate the clutch piston may be formed.

Between the clutch piston and the drive plate, a clutch compensation chamber configured to compensate for an overpressure may be formed at an opposite side of the clutch operating chamber.

The at least one fluid groove may be formed from a position spaced apart at a predetermined interval from a rotational center of the hub plate part to an inner circumferential surface of the rotor hub at an outer side based on the radial direction, and is formed along a circumferential direction of the hub plate part to be spaced apart at a predetermined angle from each other.

In the rotor hub, a discharge hole may be formed through inner and outer circumferential surfaces of the rotor hub at a position corresponding to the fluid groove.

On the outer circumferential surface of the rotor hub, a flow passage surface having a predetermined area may be formed at a position corresponding to the discharge hole.

The flow passage surface may form a predetermined gap through which the operating fluid flows between an inner circumferential surface of the rotor and it.

On the outer circumferential surface of the carrier, a cooling groove may be formed at a position corresponding to the discharge hole.

The cooling groove may form a flow space in which the operating fluid flows between the inner circumferential surface of the rotor hub and it so that the operating fluid is discharged from a radially inner side toward the outer circumferential surface of the rotor hub through the discharge hole.

The at least one fluid groove may form a cooling passage between the carrier and the rotor hub when mounting of the carrier on the rotor hub is completed.

The torque converter may include an impeller assembly fixed to the rotor hub at the transmission side and rotating with the rotor hub, a turbine disposed at a position facing the impeller assembly, a lock-up clutch provided with a lock-up piston to directly connect the rotor hub and the turbine, and a driven plate connected to the turbine and the lock-up clutch to receive torque, and connected to a spline hub connected to the transmission.

The impeller assembly may include an impeller shell and a plurality of impeller blades provided on the impeller shell, and the impeller shell is bolted to the rotor hub.

The lock-up clutch may include a first clutch drum part formed at the inside of the rotor hub based on the radial direction at the transmission side in the axial direction, at least one third friction plate coupled to the first clutch drum part and moving in the axial direction by the lock-up piston, a second clutch drum part formed at a radially outer side of the driven plate at a position spaced apart by a predetermined interval from the first clutch drum part toward a center of rotation thereof, and at least one fourth friction plate coupled to the second clutch drum part and disposed between the third friction plate and the second clutch drum part to move in the axial direction.

Between the hub plate part and the lock-up piston, a leaf spring may be interposed.

Between the hub plate part and the lock-up piston, a lock-up operating chamber configured to operate the lock-up piston may be formed.

In the rotor hub, a rotor supporting part configured to support an axial end of the rotor may be integrally formed to extend toward a radially outer side thereof on one end directed to the transmission based the axial direction.

The rotor may include both end portions based on the axial direction and a retainer may be interposed at each of the end portions, and a spacer may be interposed between the retainer and the rotor at the other end of the rotor toward the engine.

A stator may be disposed at a radially outer side of the rotor, and the stator may be fixed through a support ring in the housing.

One end portion of the drive shaft may be connected to the engine through a damper.

A first bearing may be interposed between the housing and the drive shaft, a second bearing may be interposed between the housing and the rotor hub ridge, and a third bearing may be interposed between an inner circumferential of the other end of the drive shaft and an outer circumferential surface of the hub plate part.

A sealing member that seals between the housing and the drive shaft may be mounted at a position spaced apart from the first bearing toward the engine side by a predetermined distance based on the axial direction.

The first bearing may be installed to be supported in the axial direction by a snap ring mounted on an outer circumferential surface of the drive shaft.

The second bearing may have one end toward the engine side based on the axial direction supported on a first stepped groove formed on an outer circumferential surface of the housing at a radially inner side, and the other end toward the transmission side based on the axial direction supported on a second stepped groove formed on an inner circumferential surface of the rotor hub ridge at a radially inner side.

The third bearing may have one end toward the engine side based on the axial direction supported on a third stepped groove formed on an inner circumferential surface of the other end of the drive shaft at a radially inner side, and the other end toward the transmission side based on the axial direction supported on a fourth stepped groove formed on an outer circumferential surface of the hub plate part at a radially inner side.

Advantageous Effects

As described above, according to the hybrid drive module according to an exemplary embodiment of the present invention, it is possible to selectively and smoothly transmit the torque of the engine and the motor to the transmission by installing the engine clutch and the torque converter through the rotor hub on which the rotor is mounted inside the housing, and it is possible to reduce the overall outer diameter and the full length in the axial direction by optimizing the arrangement of the engine clutch and the torque converter through the rotor hub and by forming, in the rotor hub, the cooling flow passage that is connected to the compensation chamber of the engine clutch to cool the rotor.

In addition, according to the present invention, it is possible to simplify the layout of the cooling flow passage design and to improve the durability of the rotor by smoothly supplying the operating fluid to the rotor equipped in the rotor hub and cooling it.

Furthermore, according to the present invention, it is possible to simplify the layout of the internal flow passage system and to minimize the installation space in the narrow engine room, by efficiently dividing the space inside the housing by using the rotor hub and by optimally arranging the engine clutch and the torque converter.

In addition, according to the present invention, it is possible to improve the centrifugal pressure compensation performance of the clutch compensation chamber and thus to improve the overall control performance of the engine clutch, by supplying the remaining operating fluid to the rotor by centrifugal force while maintaining the pressure of the clutch compensation chamber provided in the engine clutch.

Furthermore, according to the present invention, it is possible to improve overall marketability by improving and securing the cooling performance of the rotor and the control performance of the engine clutch.

MODE FOR INVENTION

Figure 1:
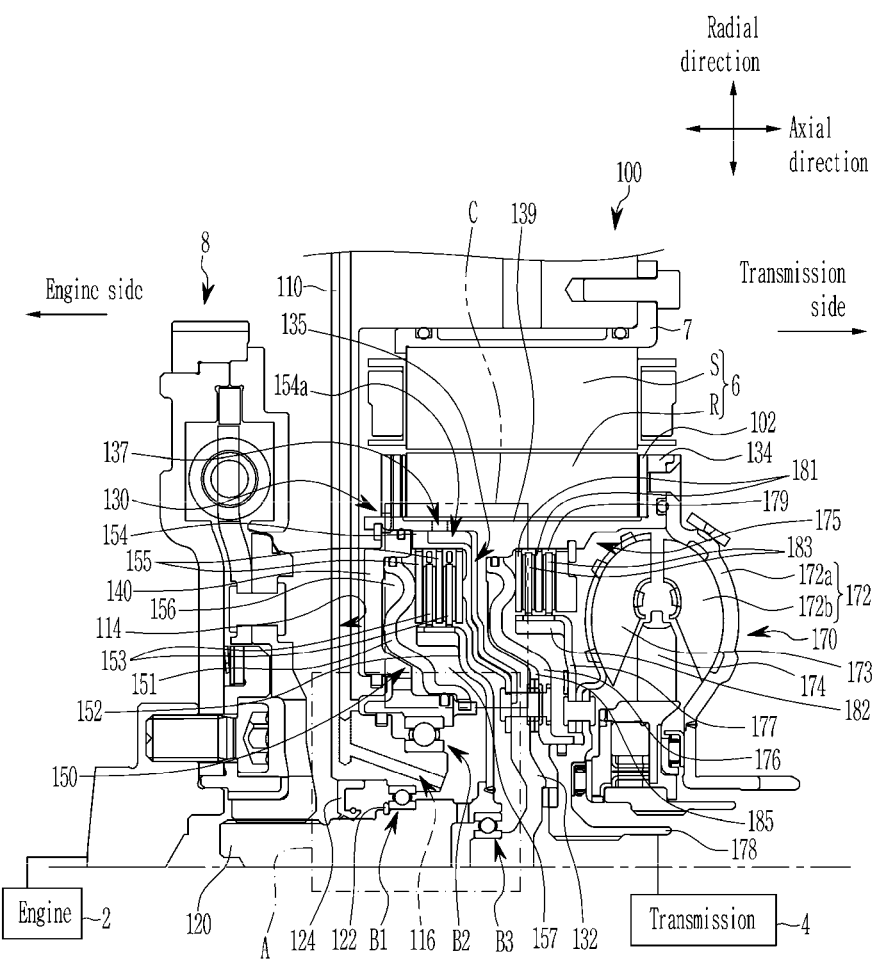
FIG. 1 illustrates a cross-sectional view of a hybrid drive module according to an exemplary embodiment of the present invention taken in an axial direction.

An exemplary embodiment of the present invention will hereinafter be described in detail with reference to the accompanying drawings.

The present invention is not limited to exemplary embodiments disclosed below, and various changes may be made and implemented in various different forms. The present exemplary embodiment is provided only to complete the disclosure of the present invention and to fully inform a person of ordinary skill in the art of the scope of the invention.

Therefore, the present invention is not limited to the exemplary embodiments disclosed below, and should be construed to include all modifications, equivalents, and substitutions included in the technical spirit and scope of the present invention as well as substituting or adding the configuration of any one embodiment and the configuration of another exemplary embodiment for each other.

The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

In order to clearly describe the present invention, parts or portions that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

In the drawings, in consideration of the convenience of understanding, the size or thickness may be exaggerated or reduced, but the protection scope of the present invention should not be construed as being limited thereto.

The terms used herein are used only to describe specific exemplary embodiments or examples, and are not intended to limit the present invention. In addition, singular expressions include plural expressions unless the context clearly dictates otherwise.

In the specification, terms such as "comprise" and "consist of" are intended to designate the existence of the features, numbers, steps, operations, components, parts, or combinations thereof described in the specification. In other words, it should be understood that terms such as "comprise" and "consist of" in the specification do not preclude the possibility of addition or existence of one or more other features or numbers, steps, operations, components, parts, or combinations thereof.

Terms including an ordinal number, such as first, second, etc., may be used to describe various elements, but the elements are not limited by the terms. The terms are used only to distinguish one element from another.

It should be understood that, when it is described that an element is "coupled" or "connected" to another element, the element may be "directly coupled" or "directly connected" to the other element, but may be "coupled" or "connected" to the other element through a third element.

In contrast, it should be understood that, when it is described that an element is "directly coupled" or "directly connected" to another element, no element is present between the element and the other element.

It should be understood that, when an element is referred to as being "over" or "under" another element, it can be directly on the other element or intervening elements may also be present.

Unless being defined otherwise, it is to be understood that the terms used in the present specification including technical and scientific terms have the same meanings as those that are generally understood by those skilled in the art.

It must be understood that the terms defined by the dictionary are identical with the meanings within the context of the related art, and they should not be ideally or excessively formally defined unless the context clearly dictates otherwise.

For convenience, in this specification, the directions are defined as follows.

A front-rear direction or the axial direction is a direction parallel to the rotation axis, and a front direction means a direction toward the power source, such as the engine, and a rear direction means the other direction, such as a direction toward the transmission. Therefore, a front surface means a surface facing the front, and a rear surface means a surface facing the rear.

A radial or radiation direction (or, "radially") means a direction closer to the center or a direction away from the center along a straight line passing through the center of the rotation axis on a plane perpendicular to the rotation axis. A direction away from the center in a radial direction is referred to as a centrifugal direction, and a direction closer to the center is referred to as a centripetal direction.

A circumferential direction means a direction of surrounding the circumference of the rotation axis. An outer perimeter means an outer circumference, and an inner perimeter means an inner circumference. Accordingly, an outer circumferential surface is a surface facing away from the rotation axis, and the inner circumferential surface is a surface facing the rotation axis.

A circumferential side surface means a surface whose normal line of the surface approximately in the circumferential direction.

Furthermore, terms such as " . . . unit", " . . . means", " . . . part", and " . . . member" described in the specification mean a unit of a comprehensive configuration having at least one function or operation.

Figure 2:
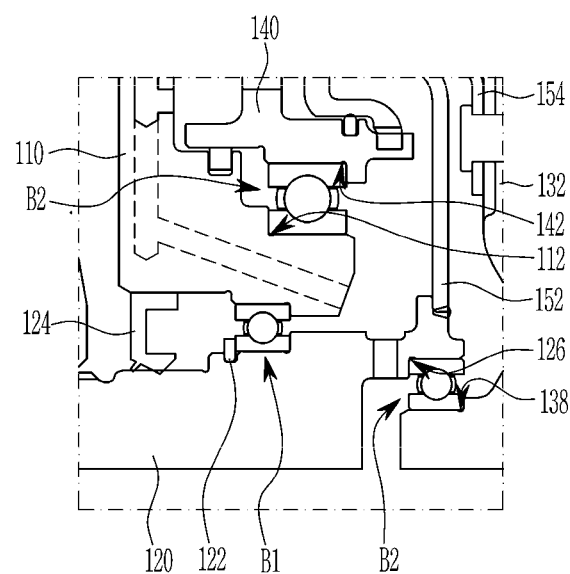
FIG. 2 illustrates an enlarged view of a portion 'A' of FIG. 1.
Figure 3:
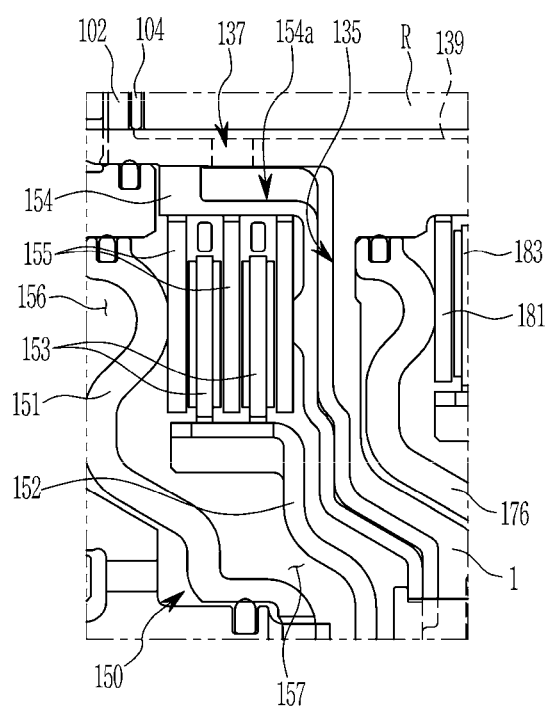
FIG. 3 illustrates an enlarged view of a portion 'C' of FIG. 1.
Figure 4:
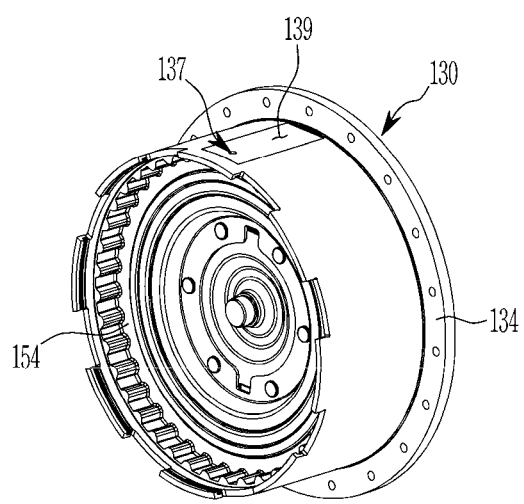
FIG. 4 illustrates a perspective view of a rotor hub to which a carrier applied to a hybrid drive module according to an exemplary embodiment of the present invention is coupled.

FIG. 1 illustrates a cross-sectional view of a hybrid drive module according to an exemplary embodiment of the present invention taken in an axial direction, FIG. 2 illustrates an enlarged view of a portion 'A' of FIG. 1, and FIG. 3 illustrates an enlarged view of a portion 'C' of FIG. 1.

FIG. 1 is a semi-cross-sectional view for explaining an exemplary embodiment of the present invention, and illustrates a hybrid drive module 100 according to an exemplary embodiment of the present invention.

Referring to FIG. 1, the hybrid drive module 100 according to an exemplary embodiment of the present invention selectively transmits torque transmitted from an engine 2 and a motor 6 to a transmission 4, and is disposed between the engine 2 and the transmission 4.

The motor 6 includes a rotor (R) and a stator (S), which are applied to a typical electric vehicle, and may simultaneously perform motor and generator functions.

Here, the hybrid drive module 100 according to an exemplary embodiment of the present invention may include a housing 110, a drive shaft 120, a rotor hub 130, a rotor hub ridge 140, an engine clutch 150, and a torque converter 170.

First, the housing 110 is disposed between the engine 2 and the transmission 4.

The drive shaft 120 is rotatably mounted inside the housing 110 in a radial direction with its one end portion toward the engine 2 based on an axial direction protruding from the housing and torque of the engine 2 is inputted to the drive shaft 120.

Here, one end portion of the drive shaft 120 protruding from the housing 110 toward the engine 2 in the axial direction may be connected to the engine 2 through a damper 8.

The damper 8 absorbs torsional force acting in a rotational direction of a shaft from the torque transmitted from the engine 2 so that the torque of the engine 2 is stably transmitted to the drive shaft 120, and reduces vibration.

In the present exemplary embodiment, the rotor hub 130 is provided within the housing 110, and the rotor (R) of the motor 6 is mounted on a radially outer side thereof.

A hub plate part 132 that extends integrally toward the drive shaft 120 at a radially inner side and that rotatably connected to the other end portion of the drive shaft 120 directed to the transmission 4 based on the axial direction is formed in the rotor hub 130.

Here, the stator (S) is disposed at the radially outer side of the rotor (R), and the stator (S) may be fixed inside the housing 110 through a support ring 7.

In the present exemplary embodiment, an inner circumferential surface of the rotor hub ridge 140 may be rotatably supported by the housing 110 based on the radial direction, and an outer circumferential surface thereof may be fixed to the rotor hub 130 from the engine 2 side based on the axial direction.

Here, a rotor supporting part 134 for supporting an axial directional end of the rotor (R) at one end toward the transmission 4 based on the axial direction may integrally extend toward the outside of the radial direction in the rotor hub 130.

One end of the rotor (R) positioned at the transmission 4 side based on the axial direction may be supported by the rotor supporting part 134.

In the present exemplary embodiment, a retainer 102 is respectively interposed at both end portions of the rotor (R) based on the axial direction, and a spacer 104 and a second retainer 106 may be interposed between the retainer 102 and the rotor (R) at the other end thereof toward the engine 2.

In this case, among the retainers 102, the retainer 102 disposed in the transmission 4 may be interposed between the rotor supporting part 134 and the rotor (R).

Meanwhile, the rotor R may be mounted at a radially outer side of the rotor hub 130 after the torque converter 170 is mounted on the rotor hub 130.

On the other hand, referring to FIG. 2, a first bearing B1 is interposed between the housing 110 and the drive shaft 120.

Here, the first bearing B1 may be installed to be supported in the axial direction by a snap ring 122 mounted on an outer circumferential surface of the drive shaft 120.

Accordingly, the first bearing B1 may be prevented from being separated by the snap ring 122 between the housing 110 and the drive shaft 120.

In addition, at a position spaced apart from the first bearing B1 toward the engine 2 side by a predetermined distance based on the axial direction, a sealing member 124 for sealing between the housing 110 and the drive shaft 120 may be mounted.

The sealing member 124 may prevent an internal operating fluid from leaking to the outside between the housing 110 and the drive shaft 120.

In the present exemplary embodiment, a second bearing B2 is interposed between the housing 110 and the rotor hub ridge 140.

Here, one end portion of the second bearing B2 toward the engine side based on the axial direction is supported in a first stepped groove 112 formed on the outer circumferential surface of the housing 110 inside the second bearing B2 in the radial direction.

The other end portion of the second bearing B2 toward the transmission 2 side based on the axial direction may be supported in a second stepped groove 142 formed on the inner circumferential surface of the rotor hub ridge 140 inside the second bearing B2 in the radial direction.

Accordingly, the second bearing B2 is prevented from being separated in the axial direction by the first and second stepped grooves 112 and 142 between the housing 110 and the rotor hub ridge 140, and it may stably and rotatably support the rotor hub ridge 140 with respect to the housing 110.

In addition, a third bearing B3 is interposed between the other end inner circumferential surface of the drive shaft 120 and an outer circumferential surface of the hub plate part 132.

Here, one end of the third bearing B3 toward the engine 2 based on the axial direction may be supported in a third stepped groove 126 formed on the inner circumferential surface of the other end of the drive shaft 120 at the inside in the radial direction.

In addition, the other end of the third bearing B3 toward the transmission 2 based on the axial direction may be supported in a fourth stepped groove 138 formed on the outer circumferential surface of the hub plate part 132 at the inside in the radial direction.

Accordingly, the third bearing B3 may be prevented from being separated between the inner circumferential surface of the other end of the drive shaft 120 and the outer circumferential surface of the hub plate part 132 in the axial direction by the third and fourth stepped grooves 126 and 138, and may stably support rotation of the drive shaft 120 and the rotor hub 130.

In the present exemplary embodiment, the engine clutch 150 is disposed at the engine 2 side in the axial direction within the housing 110 with the hub plate part 132 therebetween, as shown in FIG. 1 and FIG. 3.

As shown in FIG. 1 and FIG. 3, the engine clutch 150 may directly connect the drive shaft 120 and the rotor hub 130 to selectively transmit the torque of the engine 2 to the rotor hub 130.

Here, the engine clutch 150 may include a clutch piston 151, a drive plate 152, a first friction plate 153, a carrier 154, and a second friction plate 155.

First, an outer circumferential surface and an inner circumferential surface of the clutch piston 151 is slidably and movably mounted to the rotor hub ridge 140 in the axial direction based on the radial direction.

An inner circumferential end of the drive plate 152 is fixed to the outer circumferential surface of the other end of the drive shaft 120 in the radial direction.

The first friction plate 153 is configured in plurality, and an inner circumferential surface thereof is coupled to an outer circumferential surface of the drive plate 152.

Here, the outer circumferential surface of the drive plate 152 may be provided with a fitting groove into which the first friction plate 153 may be fitted. The inner circumferential surface of the first friction plate 153 is provided with fitting protrusions in the circumferential direction. These fitting protrusions may be inserted into the fitting groove to move in the axial direction.

In other words, one side of the fitting groove of the drive plate 152 directed to the engine 2 in the axial direction may be provided with an opening, and the fitting groove of the drive plate 152 may be penetrated in the radial direction based on the axis thereof. Accordingly, the first friction plate 153 may be moved in the axial direction by the clutch piston 151.

In the present exemplary embodiment, the carrier 154 may be fixed to the hub plate part 132 at the engine 2 side based on the axial direction.

In addition, the second friction plate 155 is configured in plurality, and is coupled to the carrier 154.

Here, another fitting groove into which the second friction plate 19 may be fitted is provided on the inner circumferential surface of the carrier 154. Accordingly, the second friction plates 154 may be coupled to the carrier 154, and may be disposed between the first friction plate 153 and the carrier 154 to move in the axial direction.

Meanwhile, in an exemplary embodiment of the present invention, another fitting groove penetrated similarly to the drive plate 152 may also be provided on the inner circumferential surface of the carrier 154, and another fitting protrusion may be provided in the axial direction on the outer circumferential surface of the second friction plate 155.

Here, a clutch operating chamber 156 for operating the clutch piston 151 by a pressure of a supplied operating fluid may be formed between the rotor hub ridge 140 and the clutch piston 151.

In other words, when the operating fluid is supplied to the clutch operating chamber 156 within the housing 110 so that a predetermined pressure is formed, the clutch piston 151, while moving toward the first and second friction plates 153 and 155 in the axial direction, frictionally contacts the first and second friction plates 153 and 155, so that it may transmit the torque of the engine 2 transmitted to the drive shaft 120 to the torque converter 170 through the rotor hub 130.

In addition, a clutch compensation chamber 157 for compensating for overpressure may be formed at an opposite side of the clutch operation chamber 156 between the clutch piston 151 and the drive plate 152.

The clutch compensation chamber 157 may compensate for overpressure in the clutch pressure chamber 156 to maintain an appropriate oil pressure, and may cool the first and second friction plates 153 and 155.

Here, in the housing 110, an operating pressure supply passage 114 and a compensation pressure supply passage 116 for supplying an operating pressure and a compensation pressure to the engine clutch 150 may be respectively formed through the inside thereof.

The operating pressure supply passage 114 may supply an operating fluid to the clutch operating chamber 156, and the compensation pressure supply passage 116 may supply an operating fluid to the clutch compensation chamber 157.

Accordingly, the clutch pressure chamber 156 and the clutch compensation chamber 157 may form pressure with the operating fluid supplied through the operating pressure and compensation pressure supply passages 114 and 116, respectively.

In addition, the torque converter 170 is disposed at the transmission 2 side in the axial direction with the hub plate part 132 interposed therebetween to be connected to the rotor hub 130.

When the vehicle is initially driven, the torque converter 170 may multiply the torque of the engine 2, the motor 6, or the engine 2 and the motor 6 to transmit it to the transmission 4, and when the vehicle is driven at a predetermined speed or higher, the torque converter 170 may transmit the torque of the engine 2, the motor 6, or the engine 2 and the motor 6 to the transmission 4 in a 1:1 ratio.

Here, the torque converter 170 may include an impeller assembly 172, a turbine 173, a reactor 174, a lock-up clutch 175, and a driven plate 177.

First, the impeller assembly 172 is fixed to the rotor hub 130 at the transmission 4 side, and may rotate together with the rotor hub 130.

Here, the impeller assembly 172 may include an impeller shell 172a of which a radially outer side end is fixed to the rotor supporting part 134 formed in the rotor hub 130 through bolt fastening, and a plurality of impeller blades 172b mounted on the impeller shell 172a.

The turbine 173 is disposed at a position facing the impeller assembly 172. The reactor 174 may be positioned between the impeller assembly 172 and the turbine 173 to change flow of the operating fluid discharged from the turbine 173 to transmit it to the impeller assembly 172 side.

In the present exemplary embodiment, the lock-up clutch 175 may include a lock-up piston 176 to directly connect the rotor hub 130 and the turbine 173.

In addition, the driven plate 177 is connected to the turbine 173 and the lock-up clutch 175 to receive torque, and is connected to a spline hub 178 connected to the transmission 4.

Here, the lock-up clutch 175 may include a first clutch drum part 179, a third friction plate 181, a second clutch drum part 182, and a fourth friction plate 183.

First, the first clutch drum part 179 is formed, at the transmission 4 side in the axial direction, inside the rotor hub 130 based on the radial direction.

The third friction plate 181 is configured in plurality, and an outer circumferential surface thereof is coupled to an inner circumferential surface of the first clutch drum part 179.

Here, a fitting groove into which the third friction plate 181 may be fitted may be provided on an inner circumferential surface of the first clutch drum part 179. The outer circumferential surface of the third friction plate 181 is provided with fitting protrusions in the circumferential direction. These fitting protrusions may be inserted into the fitting groove to move in the axial direction.

In other words, one side of the fitting groove of the first clutch drum part 179 directed to the engine 2 in the axial direction may be provided with an opening, and the fitting groove of the first clutch drum part 179 may be penetrated in the radial direction based on the axis thereof. Accordingly, the third friction plate 181 may be selectively moved in the axial direction by the lock-up piston 176.

In the present exemplary embodiment, the second clutch drum part 182 may be formed on a radially outer side of the driven plate 177 at a position spaced apart from the first clutch drum part 179 toward the center of rotation by a predetermined distance.

In addition, the fourth friction plate 183 is configured in plurality, and an inner circumferential surface thereof is coupled to an outer circumferential surface of the second clutch drum part 182.

Here, another fitting groove into which the fourth friction plate 183 may be fitted is provided on the outer circumferential surface of the second clutch drum part 182. Accordingly, the fourth friction plates 183 may be coupled to the carrier 154, and may be disposed between the third friction plate 181 and the second clutch drum part 182 to move in the axial direction.

Meanwhile, in an exemplary embodiment of the present invention, another fitting groove penetrated similarly to the first clutch drum part 179 may also be provided on the outer circumferential surface of the second clutch drum part 182, and another fitting protrusion may be provided in the axial direction on the outer circumferential surface side of the fourth friction plate 183.

Here, a leaf spring 184 may be interposed between the hub plate part 132 and the lock-up piston 176.

A plurality of leaf springs 184 may be provided to be spaced apart from each other at equal intervals along the circumferential direction between the hub plate part 132 and the lock-up piston 176. One end of the leaf spring 184 may be riveted to the hub plate part 132 to be fixed, and the other end thereof may be riveted to the lock-up piston 176 to be fixed.

The leaf spring 184 is bent at a set angle, and when the lock-up piston 176 moves from the hub plate part 132 in the axial direction during the operation of the lock-up clutch 175, the leaf spring 184 may be maintained at the bent state by the lock-up piston 176.

In this state, when the operation of the lock-up clutch 175 is released, the leaf spring 184 provides elastic force to the lock-up piston 176 while being restored to its initial shape, thereby rapidly returning the lock-up piston 176 to its initial position.

In addition, a lock-up operation chamber 185 for operating the lock-up piston 176 may be formed between the hub plate part 132 and the lock-up piston 176.

In other words, when the operating fluid is supplied to the lock-up operation chamber 185 in the housing 110 and a predetermined pressure is formed, the lock-up piston 176 frictionally contacts the third and fourth friction plates 181 and 183 while moving toward the third and fourth friction plates 181 and 183 in the axial direction, thereby transmitting the torque of the engine 2 transmitted from the engine 2, the motor 6, or the engine 2 and the motor 6 to the rotor hub 130 to the transmission 4 through the driven plate 177 and the spline hub 178 connected to the turbine 2.

In this case, the leaf spring 178 may be maintained at a bent shape from its initial shape, and when the operation of the lock-up clutch 176 is released, the leaf spring 178 provides elastic restoring force to the lock-up piston 176 while being restored to its initial shape, thereby more quickly restoring the lock-up piston 176 to its initial position.

In the hybrid drive module 100 according to an exemplary embodiment of the present invention configured as described above, at least one fluid groove 135 for supplying the operating fluid to the rotor (R) and cooling it between the rotor hub 130 and the engine clutch 150 may be formed.

The fluid groove 135 may be formed in one surface of the hub plate part 132 toward the engine clutch 150 based on the axial direction, as shown in FIG. 3 to FIG. 7.

Figure 5:
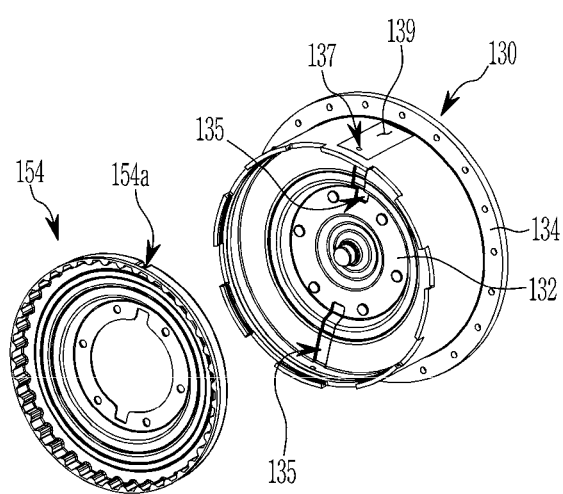
FIG. 5 illustrates an exploded perspective view of a carrier and a rotor hub applied to a hybrid drive module according to an exemplary embodiment of the present invention.
Figure 6:
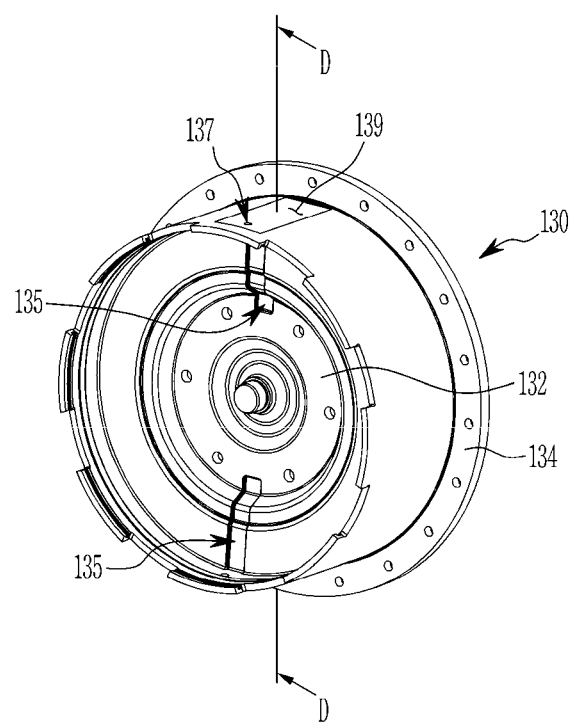
FIG. 6 illustrates a perspective view of a rotor hub applied to a hybrid drive module according to an exemplary embodiment of the present invention.
Figure 7:
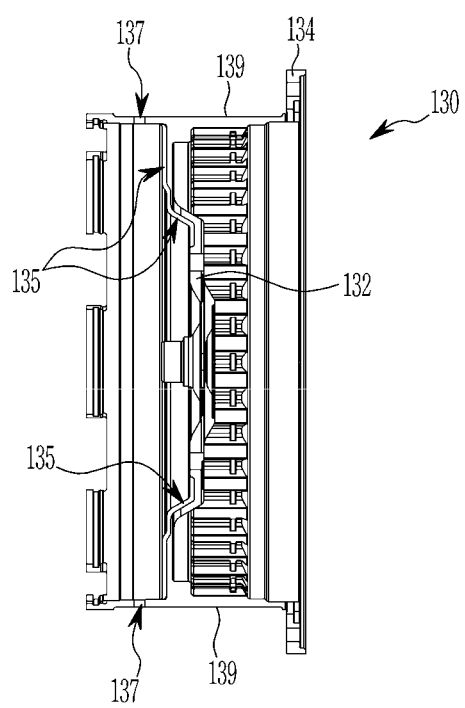
FIG. 7 illustrates a cross-sectional view taken along line D-D of FIG. 6.

In the present exemplary embodiment, as shown in FIG. 5 to FIG. 7, the fluid groove 135 may be formed from a position spaced apart from the center of rotation of the hub plate part 132 toward the radially outer side by a predetermined distance to the inner circumferential surface of the rotor hub from the outside thereof based on the radial direction.

These fluid grooves 135 may be formed to be spaced apart from each other at a set angle along the circumferential direction of the hub plate part 132, and in the present exemplary embodiment, two fluid grooves 135 may be formed to be spaced apart from each other at an angle of 180°.

Here, when the mounting of the carrier 154 to the rotor hub 130 is completed, the fluid groove 135 may form a cooling passage between one surface of the carrier 154 toward the fluid groove 135 and the rotor hub 130 (see FIG. 3).

The cooling passage communicates with the clutch compensation chamber 157, and the operating fluid introduced into the clutch compensation chamber 157 may be introduced thereinto.

Meanwhile, a discharge hole 137 may be formed in the rotor hub 130 through the inner and outer circumferential surfaces of the rotor hub 130 at a position corresponding to the fluid groove 135.

The discharge hole 137 may discharge the operating fluid supplied to the cooling passage formed between the hub plate part 132 and the carrier 154 through the fluid groove 135 to the inner circumferential surface of the rotor (R).

In addition, a flow passage surface 139 having a predetermined area at a position corresponding to the discharge hole 137 may be formed on the outer circumferential surface of the rotor hub 130 on which the rotor is mounted.

The flow passage surface 139 may be formed by flat processing so that the outer circumferential surface of the rotor hub 130 formed with a set curvature while the discharge hole 137 is positioned is flattened in parallel in the axial direction.

The flow passage surface 139 formed as described above may form a predetermined gap through which the operating fluid flows between the inner circumferential surface of the rotor (R) mounted on the rotor hub 130 and it.

In other words, the gap formed between the flow passage surface 139 and the inner circumferential surface of the rotor (R) is maintained filled with the operating fluid discharged from the discharge hole 137, so that when the rotor (R) is rotated, it is possible to more smoothly cool the rotor (R).

In the present exemplary embodiment, the flow passage surface 139 is described as an exemplary embodiment in which the outer circumferential surface of the rotor hub 130 is formed parallel to the axial direction through the flat processing, but the present invention is not limited thereto.

In other words, the flow passage surface 139 is rounded concavely from the outer circumferential surface of the rotor hub 130 toward the inner circumferential surface thereof so that the predetermined gap is formed between the outer circumferential surface of the rotor hub 130 and the rotor (R), or it may be formed to have a radius of curvature lower than that of the outer circumferential surface of the rotor hub 130.

Figure 8:
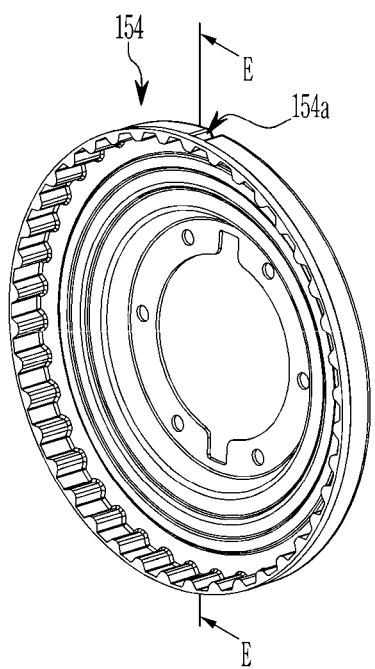
FIG. 8 illustrates a front perspective view of a carrier applied to a hybrid drive module according to an exemplary embodiment of the present invention.
Figure 9:
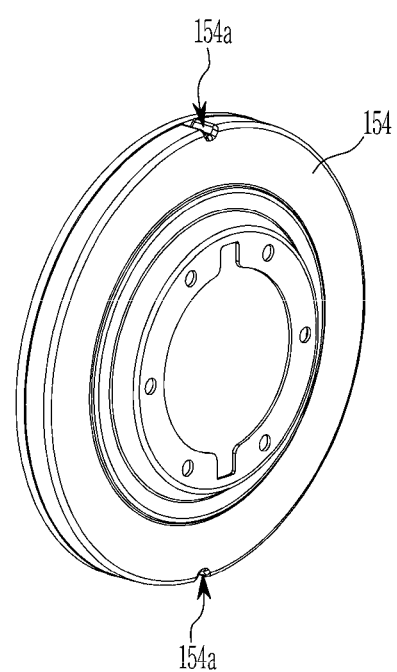
FIG. 9 illustrates a rear perspective view of a carrier applied to a hybrid drive module according to an exemplary embodiment of the present invention.
Figure 10:
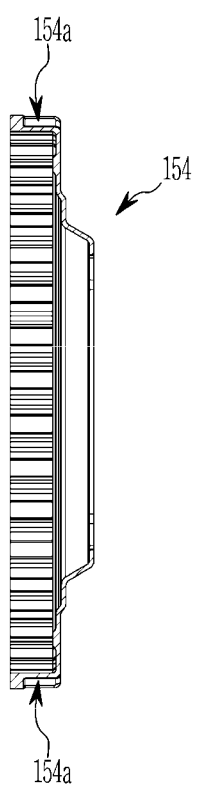
FIG. 10 illustrates a cross-sectional view taken along line E-E of FIG. 8.

On the other hand, on the outer circumferential surface of the carrier 154, as shown in FIG. 8 to FIG. 10, a cooling groove 154a may be formed at a position corresponding to the discharge hole 137.

The cooling groove 154a may form a flow space in which a operating fluid flows between the inner circumferential surface of the rotor hub 130 and it so that the operating fluid is discharged from the radially inner side toward the outer circumferential surface of the rotor hub 130 through the discharge hole 137.

In other words, when the mounting of the carrier 154 on the rotor hub 130 is completed, the fluid groove 135 forms a cooling flow passage through which the operating fluid flows from the clutch compensation chamber 157 between the carrier 154 and it.

The cooling groove 154a communicates with the cooling passage between the inner circumferential surface of the rotor hub 130 and the outer circumferential surface of the carrier 154 to form the flow space in which the operating fluid flows, and the operating fluid flowing into the cooling passage and the flow space is discharged to the discharge hole 137 by centrifugal force.

The operating fluid discharged through the discharge hole 137 flows into the gap formed between the inner circumferential surface of the rotor (R) and the flow passage surface 139, thereby smoothly cooling the rotor (R).

The flow passage of the operating fluid will be described in detail with reference to FIG. 11 attached.

Figure 11:
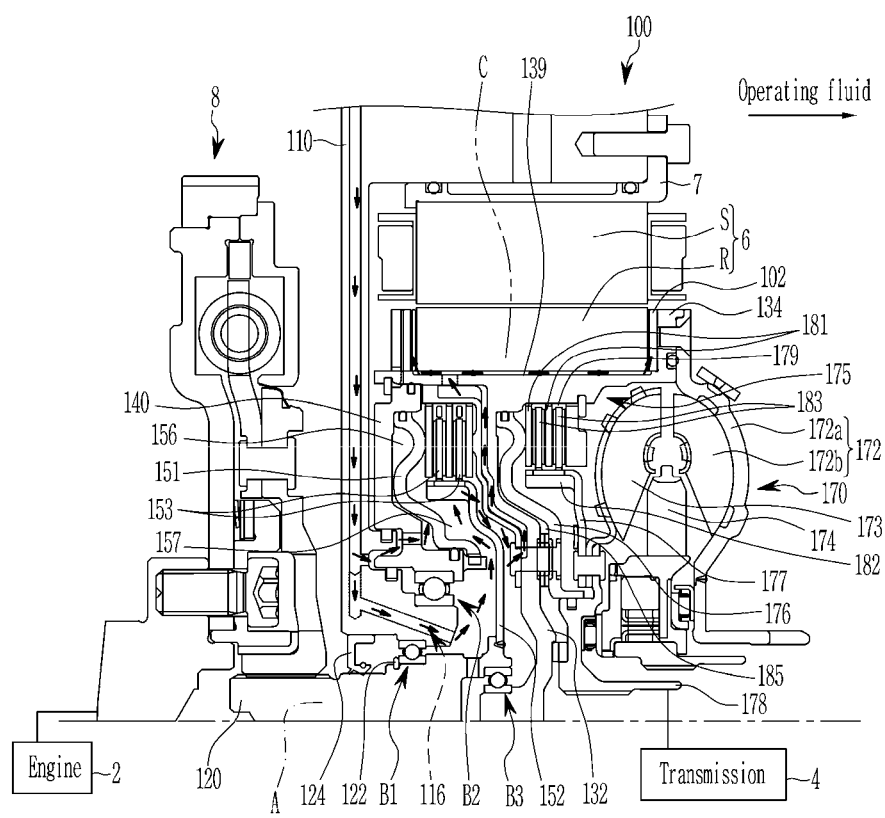
FIG. 11 illustrates a flow direction of an operating fluid in a hybrid drive module according to an exemplary embodiment of the present invention.

FIG. 11 illustrates a flow direction of an operating fluid in a hybrid drive module according to an exemplary embodiment of the present invention.

Referring to FIG. 11, in the hybrid drive module 100 configured as described above, the operating fluid flowing into the operating pressure supply passage 114 may form the operating pressure in the clutch operating chamber 156 to selectively operate the clutch piston 151.

In other words, the operating fluid flowing into the operating pressure supply passage 114 flows into the clutch operating chamber 156 through a through hole formed in the rotor hub ridge 140 to communicate with the clutch operating chamber 156.

In addition, the operating fluid flowing into the compensation pressure supply passage 116 flows into the clutch compensation chamber 157 to form a compensation pressure, and at the same time, it may smoothly cool the first and second friction clutches 153 and 155.

Here, the operating fluid flowing into the clutch compensation chamber 157 passes between the drive plate 152 and the first friction plate 153 to flow between the drive plate 152 and the carrier 154, and flows toward the radially outer side toward the rotor (R) along the cooling passage formed through the fluid groove 135 between the carrier 154 and the hub plate part 130.

Then, the operating fluid flows into the flow space formed through the cooling groove 154a between the outer circumferential surface of the carrier 154 and the inner circumferential surface of the rotor hub 130, and then, it is discharged to the discharge hole 137 through the rotor (R) by centrifugal force.

The operating fluid discharged through the discharge hole 137 flows into the gap formed between the inner circumferential surface of the rotor (R) and the flow passage surface 139, thereby smoothly cooling the rotor (R).

Accordingly, when the hybrid drive module 100 according to an exemplary embodiment of the present invention configured as described above is applied, by mounting the engine clutch 150 and the torque converter 170 through the rotor hub 130 on which the rotor (R) is mounted in the housing 110, it is possible to selectively and smoothly transmit the torque of the engine 2 and the motor 6 to the transmission 2, and at the same time, by optimizing the disposition of the engine clutch 150 and the torque converter 170 and by forming, in the rotor hub 130, the cooling flow passage that is connected to the clutch compensation chamber 157 of the engine clutch 150 and cools the rotor (R), it is possible to reduce the overall outer diameter and the axial full length.

In addition, according to the present invention, it is possible to simplify the layout of the cooling flow passage design and to improve the durability of the rotor (R) by smoothly supplying the operating fluid to the rotor (R) mounted on the rotor hub 130 to cool it.

In addition, according to the present invention, by efficiently dividing the inner space of the housing 110 by using the rotor hub 130 and by optimally disposing the engine clutch 150 and the torque converter 170, it is possible to simplifying the layout of the internal flow system, and it is possible to minimize the installation space inside the narrow engine room.

In addition, according to the present invention, by supplying the remaining operating fluid to the rotor (R) by centrifugal force while maintaining the pressure of the clutch compensation chamber 157 provided in the engine clutch 150, it is possible to improve the centrifugal pressure compensation performance of the clutch compensation chamber 157, thereby improving the overall control performance of the engine clutch 150.

Furthermore, according to the present invention, it is possible to improve the overall marketability of the hybrid drive module 100 by improving and securing the cooling performance of the rotor (R) and the control performance of the engine clutch 150.

While this invention has been described in connection with what is presently considered to be practical embodiments, it is to be understood that the invention is not limited to the disclosed embodiments. On the contrary, is intended to cover various modifications and equivalent arrangements included within the spirit and scope of the appended claims.

In addition, even if effects of the configuration of the present invention are not explicitly described while describing exemplary embodiments of the present invention, it is to be noted that effects predictable by the configuration should also be recognized.

The invention claimed is:

1. A hybrid drive module that selectively transmits torque transmitted from an engine and a motor to a transmission, comprising:
   a housing disposed between the engine and the transmission;
   a drive shaft rotatably mounted inside the housing in a radial direction with one end portion toward the engine based on an axial direction protruding from the housing and to which torque of the engine is inputted;
   a rotor hub provided within the housing and mounted with a rotor of the motor on a radially outer side of the rotor hub, and in which a hub plate part integrally extending toward the drive shaft and rotatably connected to the another end portion of the drive shaft toward the transmission based on the axial direction is formed on a radially inner side of the rotor hub;

a rotor hub ridge, an inner circumferential surface of which is rotatably supported by the housing based on the radial direction and an external circumferential surface of which is fixed to the rotor hub based on the axial direction at the side of the engine;

an engine clutch disposed at the engine side in the axial direction with the hub plate part interposed therebetween, and configured to directly connect the drive shaft and the rotor hub to selectively transmit the torque of the engine to the rotor hub; and a torque converter disposed at the side of the transmission in the axial direction with the hub plate part interposed therebetween to be connected to the rotor hub, and configured to multiply the torque of the engine, torque of the motor, or the torque of the engine and the motor when a vehicle is initially driven, or to transmit it to the transmission in a ratio of 1:1, wherein at least one fluid groove for supplying an operating fluid to the rotor to cool the rotor between the rotor hub and the engine clutch is formed on a surface of the hub plate part toward the engine clutch based on the axial direction.

2. The hybrid drive module of claim 1, wherein:
the engine clutch comprises:
a clutch piston, an outer circumferential surface and an inner circumferential surface of the clutch piston, based on the radial direction, being mounted on the rotor hub ridge slidably in the axial direction;
a drive plate, an inner circumferential end of which is fixed to an outer circumferential surface of the another end portion of the drive shaft based on the radial direction;
at least one first friction plate coupled to the drive plate and configured to move by the clutch piston in the axial direction;
a carrier fixed to the hub plate part at the engine side based on the axial direction; and
at least one second friction plate coupled to the carrier and disposed between the first friction plate and the carrier to move in the axial direction.

3. The hybrid drive module of claim 2, wherein:
between the rotor hub ridge and the clutch piston,
a clutch operating chamber configured to operate the clutch piston is formed.

4. The hybrid drive module of claim 3, wherein:
between the clutch piston and the drive plate,
a clutch compensation chamber configured to compensate for an overpressure is formed at an opposite side of the clutch operating chamber.

5. The hybrid drive module of claim 2, wherein:
the at least one fluid groove
is formed from a position spaced apart at a predetermined interval from a rotational center of the hub plate part to an inner circumferential surface of the rotor hub at an outer side based on the radial direction, and is formed along a circumferential direction of the hub plate part to be spaced apart at a predetermined angle from each other.

6. The hybrid drive module of claim 2, wherein:
in the rotor hub,
a discharge hole is formed through inner and outer circumferential surfaces of the rotor hub at a position corresponding to the fluid groove.

7. The hybrid drive module of claim 6, wherein:
on the outer circumferential surface of the rotor hub,
a flow passage surface having a predetermined area is formed at a position corresponding to the discharge hole.

8. The hybrid drive module of claim 7, wherein:
the flow passage surface
forms a predetermined gap through which the operating fluid flows between an inner circumferential surface of the rotor and the flow passage surface.

9. The hybrid drive module of claim 6, wherein:
on an outer circumferential surface of the carrier,
a cooling groove is formed at a position corresponding to the discharge hole.

10. The hybrid drive module of claim 9, wherein:
the cooling groove
forms a flow space in which the operating fluid flows between the inner circumferential surface of the rotor hub and the cooling groove so that the operating fluid is discharged from a radially inner side toward the outer circumferential surface of the rotor hub through the discharge hole.

11. The hybrid drive module of claim 2, wherein:
the at least one fluid groove
forms a cooling passage between the carrier and the rotor hub when mounting of the carrier on the rotor hub is completed.

12. The hybrid drive module of claim 1, wherein:
the torque converter comprises:
an impeller assembly fixed to the rotor hub at the transmission side and rotating with the rotor hub;
a turbine disposed at a position facing the impeller assembly;
a lock-up clutch provided with a lock-up piston to directly connect the rotor hub and the turbine; and
a driven plate connected to the turbine and the lock-up clutch to receive torque, and connected to a spline hub connected to the transmission.

13. The hybrid drive module of claim 12, wherein:
the impeller assembly
comprises an impeller shell and a plurality of impeller blades provided on the impeller shell, and the impeller shell is bolted to the rotor hub.

14. The hybrid drive module of claim 12, wherein:
the lock-up clutch comprises:
a first clutch drum part formed at the inside of the rotor hub based on the radial direction at the transmission side in the axial direction;
at least one third friction plate coupled to the first clutch drum part and moving in the axial direction by the lock-up piston;
a second clutch drum part formed at a radially outer side of the driven plate at a position spaced apart by a predetermined interval from the first clutch drum part toward a center of rotation thereof; and
at least one fourth friction plate coupled to the second clutch drum part and disposed between the third friction plate and the second clutch drum part to move in the axial direction.

15. The hybrid drive module of claim 13, wherein:
between the hub plate part and the lock-up piston,
a leaf spring is interposed.

16. The hybrid drive module of claim 13, wherein:
between the hub plate part and the lock-up piston,
a lock-up operating chamber configured to operate the lock-up piston is formed.

17. The hybrid drive module of claim 1, wherein:
in the rotor hub,
a rotor supporting part configured to support an axial end of the rotor is integrally formed to extend toward a radially outer side thereof on one end directed to the transmission based the axial direction.

18. The hybrid drive module of claim 1, wherein:
the rotor
includes both end portions based on the axial direction and a retainer is interposed at each of the end portions, and a spacer is interposed between the retainer and the rotor at the other end of the rotor toward the engine.

19. The hybrid drive module of claim 1, wherein:
a stator is disposed at a radially outer side of the rotor, and the stator is fixed through a support ring in the housing.

20. The hybrid drive module of claim 1, wherein:
one end portion of the drive shaft
is connected to the engine through a damper.

21. The hybrid drive module of claim 1, wherein:
a first bearing is interposed between the housing and the drive shaft,
a second bearing is interposed between the housing and the rotor hub ridge, and
a third bearing is interposed between an inner circumferential surface of the other end of the drive shaft and an outer circumferential surface of the hub plate part.

22. The hybrid drive module of claim 21, wherein:
a sealing member configured to seal between the housing and the drive shaft is mounted at a position spaced apart from the first bearing toward the engine side by a predetermined distance based on the axial direction.

23. The hybrid drive module of claim 21, wherein:
the first bearing
is installed to be supported in the axial direction by a snap ring mounted on an outer circumferential surface of the drive shaft.

24. The hybrid drive module of claim 21, wherein:
the second bearing has
one end toward the engine side based on the axial direction supported on a first stepped groove formed on an outer circumferential surface of the housing at a radially inner side, and
other end toward the transmission side based on the axial direction supported on a second stepped groove formed on an inner circumferential surface of the rotor hub ridge at a radially inner side.

25. The hybrid drive module of claim 21, wherein:
the third bearing has
one end toward the engine side based on the axial direction supported on a third stepped groove formed on an inner circumferential surface of the other end of the drive shaft at a radially inner side, and
other end toward the transmission side based on the axial direction is supported on a fourth stepped groove formed on an outer circumferential surface of the hub plate part at a radially inner side.

* * * * *